United States Patent Office 2,901,443
Patented Aug. 25, 1959

2,901,443
PROCESS FOR PREPARING HIGH MOLECULAR COMPOUNDS

Werner Starck, Hofheim (Taunus), Hans Starck, Frankfurt am Main, and Felix Schülde, Bad Soden (Taunus), Germany, assignors to Farbwerke Hoechst Aktiengesellschaft vormals Meister Lucius & Brüning, Frankfurt am Main, Germany, a corporation of Germany No Drawing. Application March 6, 1956
Serial No. 569,696

Claims priority, application Germany March 9, 1955

9 Claims. (Cl. 260—2)

The present invention relates to a process for preparing high molecular compounds.

A great number of high molecular substances which can be prepared from low molecular starting materials by polyaddition, is widely used in industry for making shaped bodies, foils, fibers, adhesives and coating compositions; on account of their good solubility, low viscosity or low melting point, the low molecular starting materials can easily be moulded or worked up and can be then converted into the desired high molecular state under the action of suitable reaction-promoting agents without formation of volatile by-products that form bubbles or cracks. These high molecular substances combine so to speak the favorable properties of the specific condensation resins, such as the phenoplastics and amino-plastics, with those of the polymerization products, such as polystyrene, but on the other hand they do not exhibit the less favorable properties of these two classes of substances; these high molecular substances can be moulded as easily as the condensation resins in the A-state, or most of the polymers but, contrary to the polymers, they can be hardened, i.e. converted into a fusible and chemically more resistant state; contrary to the condensation resins which have been first referred to, the high molecular substances can be hardened without formation of disturbing by-products.

In British Patent No. 461,354 is described a process, wherein ethylene imine or the derivatives thereof together with ethylene oxide or the reaction products thereof can be reacted with organic components. In this known process there is reacted together with ethylene imine either the simple ethylene oxide which, due to its being easily volatile, requires certain precautions in industry, or the reaction products thereof, with organic components, which however, in this case can no longer contain the reactive ethylene oxide ring. Furthermore, it is necessary in this process to use catalysts.

Now we have found that plastic materials can be obtained by reacting esters which contain the ethylene imine grouping with compounds containing more than one ethylene oxide group.

The esters used according to this invention which contain ethylene imine correspond to the following general formula:

wherein R' represents a monovalent to hexavalent hydrocarbon radical containing 1 to 10 carbon atoms wherein the hydrocarbon chain of the hydrocarbon radicals may be interrupted by oxygen atoms or sulfur atoms or tertiary nitrogen atoms, and wherein R represents bivalent aliphatic or araliphatic radicals containing 2 to 14 carbon atoms and wherein $n$ is an integer from 1 to 6.

The following formulae demonstrate, for example, how the compounds used according to this invention may be composed

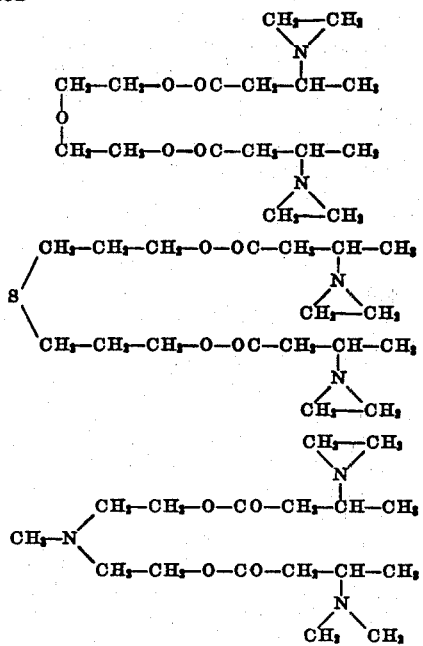

Furthermore, there may be named various bivalent hydrocarbon radicals which may be represented in the above formulae by the substituent R:

(1)
(2)
(3)
(4)
(5)

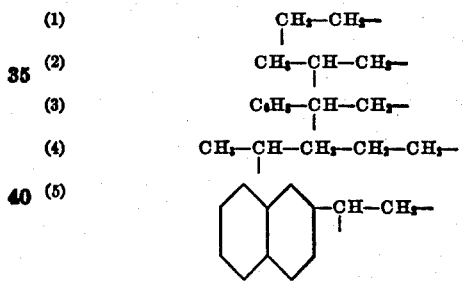

The compounds used in the process of this invention which contain ethylene oxide groups corresponding to the formula:

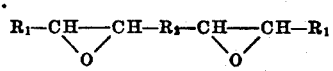

wherein $R_2$ represents a methylene, phenylene, methylphenylene, naphthalene radical and may also represent radicals of the following formulae

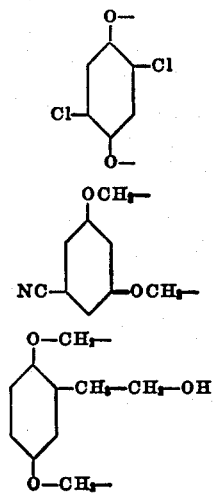

and wherein $R_1$ may also represent aliphatic radicals containing 1 to 6 carbon atoms which may be branched, aromatic hydrocarbon radicals such as phenyl, or naphthyl, isocyclic radicals such as cyclohexyl and, furthermore, heterocyclic radicals such as the furfuryl radical.

These ethylene oxide compounds can be obtained, for example, by epoxidation of unsaturated substances with per-compounds, or by reaction of hydroxyl compounds with epichlorhydrin.

The process of this invention offers the particular advantage that the reaction can be conducted without the use of catalysts, which is often desired in industry. It could not be foreseen that the above reaction would proceed in the absence of catalysts, since the individual components yield polyaddition products only in the presence of a catalyst.

The plastic materials obtained according to this invention are homogeneous light-colored substances.

The reaction between the two classes of compounds can be achieved both at room temperature and at a raised temperature, for example at 15 to 200° C., and in the absence or presence of a solvent or diluent.

As solvents or diluents suitable for use in the process of this invention there may be used ketones such as acetone and cyclohexanone, or aromatic compounds such as benzene and toluene, or esters such as methyl acetate or butyl acetate, monoethers of ethylene glycol, or halogenated hydrocarbons such as chloroform, or alcohols such as butanol, or related compounds of the aforesaid substances, or mixtures thereof. In any case, the final products obtained are homogeneous and clear and it is noticeable that they are excellently compatible. This latter property could not all be foreseen, the more so since the ethylene imine esters hitherto known involved the disadvantage to be hardenable only with difficulty in admixture with other substances. Although combinations of this kind occasionally were compatible with one another in the uncondensed phase, such compatibility nevertheless was reduced pari passu with the molecular enlargement; in the field of the high molecular chemistry it is a known phenomenon that compounds compatible one with another in the low molecular state, may lose such compatibility dependent on the degree by which one or all components are subject to a molecular enlargement. The reaction products of ethylene imine esters and epoxide compounds are, however, compatible one with another, regardless of the molecular weight, in any proportion ranging from 1:200 to 200:1, that is to say in the case where one component may be present in a great excess.

Such good mutual compatibility is particularly valuable, for example, in the case where it is desired to process epoxide groups-containing compounds which are stable at room temperature, in a liquid form that is capable of being cast. Such compounds are, for example, the condensation products obtained by reacting epichlorhydrin or 1.3-dichlorhydrin in an alkaline medium with bivalent phenols at a molar proportion of epichlorhydrin (dichlorhydrin):bivalent phenol of less than 1.5:1. No difficulties arise in preparing high-percent solutions of these solid resins in ethylene imine esters; these solutions have a viscosity that still allows of processing them at room temperature, i.e. at about 20° C., in the form of cast resins, the solvent used being incorporated into the resin compositions during hardening.

As has already been mentioned above, it is possible to effect hardening which leads to the formation of cross-linked products both at room temperature and at a raised temperature. Depending on the temperatures applied during hardening and the proportion selected for reacting the two components, preferably a proportion of 1:10 to 10:1, the consistency of the final products may range from a soft rubber-like and very flexible state to a very hard state that can be scratched with a steel edge only with difficulty.

Thus, for example, a hard rubber-like product that can only difficultly be scratched with a steel edge is obtained by reacting 10 parts by weight of epoxide resin, for example with the epoxy-equivalent 300, with 3 parts by weight of bis-(ethylene-imino-butyric acid)-glycol ester.

Soft rubber-like products are obtained by reacting, for example, 3 parts of epoxide resin (for example with the epoxyequivalent 300) with 10 parts of bis-(ethyleneaminobutyric acid)-glycol ester. Similar soft-rubber-like products are likewise disclosed in Example 6 of the present application.

Since each of the two classes of compounds per se may be subject to a molecular enlargement by polyaddition while suitable catalysts are present at the same time, it is also possible, in the case where one of the two reactants is present in a very large excess, to add for each of the two classes of substances a known specific catalyst, such as neutral sulfuric acid esters, for example dipropyl sulfate or anhydrides of organic carboxylic acids, such as phthalic anhydride or compounds having movable hydrogen atoms, for example, primary and secondary amines, such as ethylene-diamine or piperidine, and in this manner to modify the hardening process. In this case, it is of course necessary to add the second catalyst when the reaction between the ethylene imine ester and the epoxide compound is not beyond a stage, where it is impossible to incorporate the catalyst homogeneously into the reaction mass. On the other hand, it is possible to conduct the reaction in the reverse direction, that is to say one or both components are first pre-polymerized with a catalyst specific for these components; in this case, the amount of catalyst or the time of reaction are selected so as to avoid that the pre-polymerization yields insoluble or infusible products (see Example 7). Only after such pre-polymerization, the already high molecular intermediates are reacted with one another, whereby the final stage of the molecular enlargement is achieved. It is obvious that on account of the variation possibilities offered, it is easily possible to arrive at the appropriate form for the working up of these high molecular products for practically all fields of application where they can be used, for example as regards viscosity, melting point, hardening temperature, the time required for hardening etc.

The following examples serve to illustrate the invention, but they are not intended to limit it thereto, the parts being by weight unless otherwise stated and the relationship of parts by weight to parts by volume being the same as that of the kilogram to the liter.

*Example 1*

50 parts of a bis-(beta-ethylene-imino-butyric acid)-diglycol ester are carefully stirred at room temperature (about 20° C.) with 50 parts of a resorcin epoxide resin (prepared in known manner by reacting 6 mols of epichlorhydrin at 70 to 98° C. with 1 mol of resorcin in the presence of 2 mols of sodium hydroxide, distilling off the unreacted epichlorhydrin and removing the sodium chloride formed in the condensation as a by-product). The mixture obtained is distinguished by its very light color (a pale yellow) and a low viscosity, so that even moulds having very narrow extensions can be completely filled and air bubbles, if any, can escape without difficulty. If this mixture is allowed to stand at room temperature, the outset of the reaction is accompanied by a slight increase of the temperature of the reaction mixture. This mixture can be well cast for about 6 hours; after that time, the mixture becomes gradually more viscous. After about 3 to 4 days, the mixture has become so hard that it can be just scratched with a knife; in addition to its hardness, the mixture possesses a good elasticity and shows no formation of bubbles or cracks; furthermore, it exhibits a good adhesiveness and is completely clear and absolutely homogeneous, that is to say free from any formation of streaks.

Owing to the aforesaid properties this reaction mixture is particularly suitable for making electro-technical articles of complicated form.

*Example 2*

10 parts of a bis-(beta-ethylene-imino-butyric acid)-diglycol ester and 10 parts of a resorcin epoxide resin (prepared as described in Example 1) are carefully stirred at about 20° C., then subjected to a pre-reaction for 6 hours at 20° C. and stirred with 0.1 part by volume of a sulfo-ester such as dipropylsulfate; the substances are mixed thoroughly and then subjected to an after-hardening process at 70° C. The mass gelatinizes within 5 minutes and the temperature is kept for 1 hour at 70° C. in order to complete the reaction. The mixture so obtained has a good hardness associated with a good flexibility; it is of very light color, absolutely clear and shows no signs of crack formation, which would prove a non-uniform hardening or a shrinking during the hardening process.

Contrary thereto, a bis - (beta - ethlene - imino - butyric acid)-diglycol ester per se that has been hardened in the same manner is considerably more brittle and tends to the formation of cracks.

*Example 3*

3 parts of a bis-(beta-ethylene-imino-butyric acid)-diglycol ester are stirred in a beaker with 10 parts of a highly viscous epoxide compound of 4.4'-dihydroxydiphenylpropane-(2) and, after all air bubbles have escaped from the mass, the mixture is placed for 24 hours into a warming cabinet having a temperature of 100° C. The reaction product obtained is a clear, yellow-brown, very hard and at the same time very elastic mass that possesses excellent electric properties.

*Example 4*

2.6 parts of the bis-(beta-ethylene-imino-propionic acid)-diglycol ester are stirred with 5.0 parts of a resorcin epoxide compound prepared as described in Example 1. The solution of medium viscosity so obtained is applied onto sheet metal strips and the films applied to sheet metal as support are heat cured for 3 hours at 100° C. After the enamel finish, there are obtained very hard, practically colorless films of a good resistance to the action of chemical agents.

*Example 5*

1.3 parts of the liquid beta-ethylene-imino-propionic acid methyl ester boiling at 68° C. under a pressure of 8 mm. of mercury are mixed with 5.0 parts of a liquid resorcin epoxide compound prepared as described in Example 1. The solution so obtained is then applied in thin layers onto two glass plates, the two plates are superposed with the coated sides adjoining and placed for 4 hours into a warming cabinet having a temperature of 100° C. After cooling, the glass plates are firmly adhering to each other.

*Example 6*

.1 part of a bis-(beta-ethylene-imino-butyric acid)-diglycol ester is well stirred with 1 part of an epoxide compound of 4.4'-dihydroxydiphenol-propane-(2), the viscosity of which compound amounts to about 300 centipoises at 100° C. After all air bubbles have escaped from the mixture, the mass is hardened for 30 minutes at 200° C. in a warming cabinet.

The reaction product is a clear, yellow and soft rubber-like substance that possesses excellent electric properties.

*Example 7*

95 parts of an epoxide resin having a viscosity of 5000 poises which has been prepared on the basis of 4.4'-dihydroxydiphenyl-dimethyl-methane, are mixed with 5 parts of bis-(beta-ethylene-imino-butyric acid)-glycol ester and kept for 10 minutes at 75 to 80° C. After storage for 5 days at about 20 to 25° C., the mass has condensed to form a hard resin that can be broken. By heating that resin, which is hard at room temperature, to 150° C., it becomes again thinly liquid and reacts very rapidly with acid anhydrides. Thus, for example, a mixture consisting of 50 parts of the pre-condensed resin and 16 parts of phthalic anhydride gelatinizes at 150° C. within 3 minutes.

We claim:

1. In a process for preparing a plastic material, the step which comprises reacting, at a temperature within the range of 15 to 200° C., one to ten parts of an ethylene imine ester corresponding to the general formula

wherein R' represents a monovalent to hexavalent radical selected from the group consisting of hydrocarbon radicals containing one to ten carbon atoms, hydrocarbon radicals containing one to ten carbon atoms the chains of which are interrupted by a heteroatom selected from the group consisting of oxygen, sulfur, tertiary nitrogen, and wherein R represents a bivalent radical selected from the group consisting of aliphatic and aralkyl radicals containing two to fourteen carbon atoms, and wherein $n$ is an integer from 1 to 6, with ten to one parts of a compound containing more than one ethylene oxide group in the molecule.

2. In a process for preparing a plastic material, the step which comprises reacting, at a temperature within the range of 15 to 200° C., one to ten parts of an ethylene imine ester corresponding to the general formula

wherein R' represents a monovalent to hexavalent radical selected from the group consisting of hydrocarbon radicals containing one to ten carbon atoms, hydrocarbon radicals containing one to ten carbon atoms the chains of which are interrupted by a heteroatom selected from the group consisting of oxygen, sulfur, tertiary nitrogen, and wherein R represents a bivalent radical selected from the group consisting of aliphatic and aralkyl radicals containing two to fourteen carbon atoms, and wherein $n$ is an integer from 1 to 6, with ten to one parts of an ethylene oxide compound corresponding to the general formula

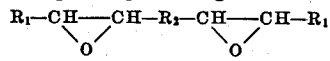

wherein $R_2$ represents a bivalent radical selected from the group consisting of aliphatic, aromatic and aralkyl radicals, aliphatic, aromatic and aralkyl radicals the carbon chains of which are interrupted by a heteroatom selected from the group consisting of oxygen, sulfur, nitrogen, and wherein $R_1$ represents a member selected from the group consisting of aliphatic radicals containing one to six carbon atoms, aromatic hydrocarbon radicals, cycloaliphatic radicals and heterocyclic radicals.

3. In the process claimed in claim 1, the step which comprises conducting the reaction at room temperature.

4. In the process claimed in claim 1, the step which comprises conducting the reaction at an elevated temperature up to 200° C.

5. In the process as claimed in claim 1, the step which comprises reacting as ethylene imine compound the compound of the formula

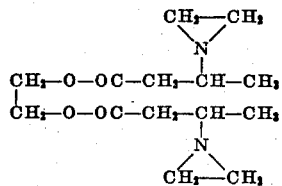

with the ethylene oxide compound.

6. In the process as claimed in claim 1, the step which comprises reacting as ethylene imine compound the compound of the formula

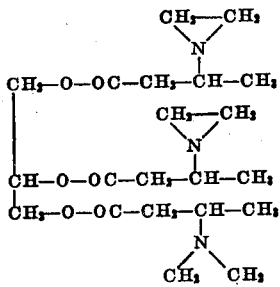

with the ethylene oxide compound.

7. In the process as claimed in claim 1, the step which comprises reacting as ethylene imine compound the compound of the formula

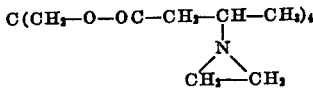

with the ethylene oxide compound.

8. The products obtained by the process as claimed in claim 1.

9. Polymerization product of an ethylene imine ester and a compound having more than one ethylene oxide group in the molecule, the relative proportions of said ester and said ethylene oxide-containing compound being from 1:10 to 10:1, said ethylene imine ester corresponding to the general formula

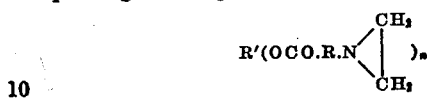

wherein $n$ is an integer from 1 to 6, R represents a group selected from the class consisting of bivalent aliphatic and aralkyl radicals containing from two to fourteen carbon atoms, and R' represents a monovalent to hexavalent group selected from the class consisting of $C_1$ to $C_{10}$ hydrocarbon groups and $C_1$ to $C_{10}$ groups having carbon chains interrupted by a member selected from the group consisting of oxygen, sulfur and tertiary nitrogen atoms.

References Cited in the file of this patent
UNITED STATES PATENTS

| | | |
|---|---|---|
| 2,296,225 | Ulrich | Sept. 15, 1942 |
| 2,626,931 | Bestian | Jan. 27, 1953 |
| 2,712,535 | Fisch | July 5, 1955 |